INVENTORS
ROBERT T. SCHMIDT
FREDERICK J. SICHENEDER
PAUL W. ROWE

ATTORNEYS

Sept. 20, 1971  R. T. SCHMIDT ET AL  3,606,271
AUTOMATIC MIXER

Filed Aug. 4, 1969  4 Sheets-Sheet 3

INVENTORS
ROBERT T. SCHMIDT
FREDERICK J. SICHENEDER
PAUL W. ROWE

BY Whittemore, Hulbert
& Belknap  ATTORNEYS

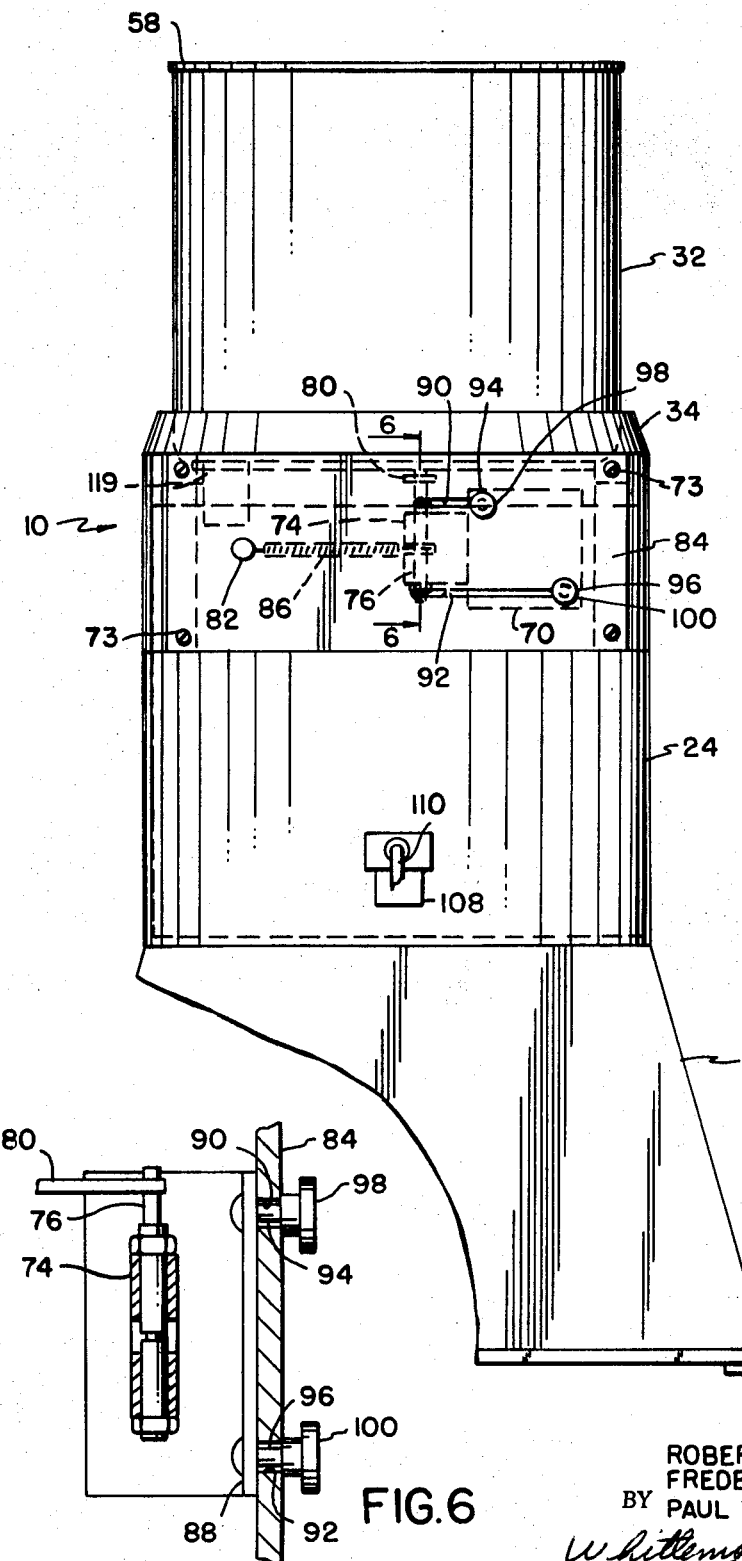

United States Patent Office 3,606,271
Patented Sept. 20, 1971

3,606,271
AUTOMATIC MIXER
Robert T. Schmidt, Port Huron, Frederick J. Sicheneder, Washington, and Paul W. Rowe, Bay City, Mich., assignors to Ruffy Research & Engineering, Inc., Detroit, Mich.
Filed Aug. 4, 1969, Ser. No. 847,295
Int. Cl. B01f 7/16
U.S. Cl. 259—24
13 Claims

ABSTRACT OF THE DISCLOSURE

An automatic mixer is provided for mixing a liquid and powdered material together. The mixer includes a mixing tank and a reservoir for powdered material. The tank is first filled with liquid. Powder in a desired volume is then dispensed into the tank. The contents of the tank are agitated. Electrical circuitry is provided to automate the entire cycle of operation.

BACKGROUND OF THE INVENTION

Various forms of mixing devices have been proposed in the past. One of the principal problems associated wtih previous mixing devices is that they have not been sufficiently automatic to minimize the time consuming process of measuring, agitating, draining and cleaning to a satisfactory degree. Mixing is particularly difficult in instances where a predetermined amount of powdered material must be intermixed into a liquid to result in a final mixture which is homogeneous.

The problem has been particularly acute in connection with the provision of barium sulphate solutions for use in medical X-ray techniques. Past practice has been to make the mixture essentially by hand. Blenders have been utilized and the proper amount of liquid, namely water, and the proper amount of barium sulphate powder have been hand measured and charged to the blender. The mixture is then agitated sufficiently for use. The entire process has been time consuming.

In accordance with the present invention, the automatic mixture is provided which merely needs to be turned on by means of a switch in order to be completely charged, mixed and provided for dispensing of a complete batch of material. Means are provided for automatically replenishing the supply when it reaches a predetermined low. Additional means are provided for easy cleansing of the mixing tank.

SUMMARY OF THE INVENTION

The automatic mixer comprises a mixing tank having power-driven agitator means therein. An inlet and inlet valve for liquid are provided on the tank. First electrical means are provided to open and close the valve. An outlet from the tank is provided. Liquid level sensing means are provided in the tank operative to generate a first signal and cause said first electrical means to open said valve when the level reaches a predetermined low and operative to generate a second signal and cause said first electrical means to close said valve when the level reaches a predetermined high. A reservoir for powdered material is provided above the tank. There is a partition between the tank and reservoir. The partition has aperture means for gravity flow of powdered material. Closure means are provided for the aperture means. Second electrical means are provided to open the closure means. An electrically operated timer structure is operative upon energization to close the closure means after a predetermined interval. The second signal from the liquid level sensing means is operative to cause said second electrical means to open the closure means and to energize the timer structure.

In the drawings:

FIG. 5 is another side elevational view, with a part broken away, of the automatic mixer illustrating the adjusting structure for the hopper control solenoid; and FIG. 6 is a sectional view taken substantially along the line 6—6 of FIG. 5 looking in the direction of the arrows.

Figure 1:
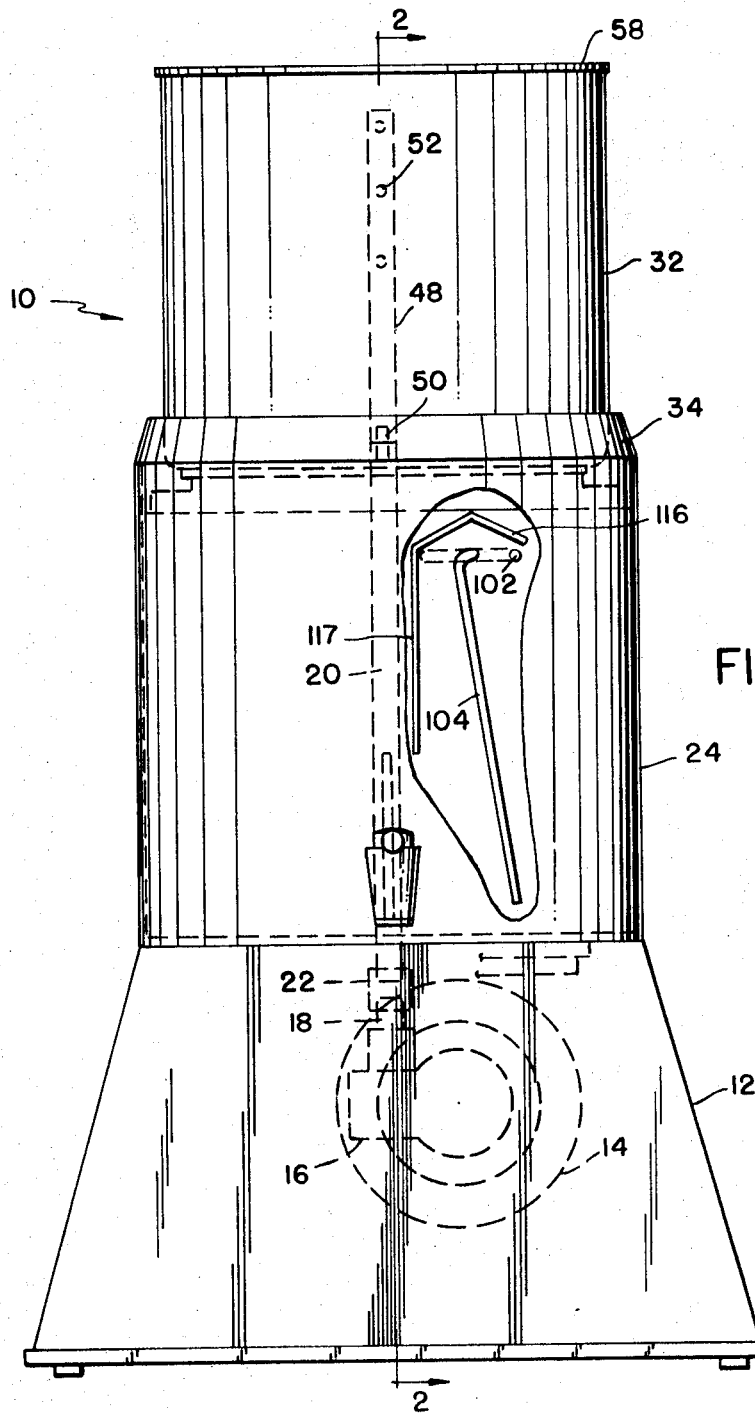
FIG. 1 is a front elevational view of the embodiment of the automatic mixer of the present invention.

The automatic mixer 10 comprises a base 12 in which is mounted an electric motor 14. The output shaft of the motor is connected to a gear box 16 which is of the speed-reduction type. The output shaft 18 of the gear box 16 is connected to an upstanding drive shaft 20 by means of a flexible coupling 22. The shaft 20 extends through a mixing tank 24 which is mounted on top of the base 12. The shaft 20 is suitably journaled in bearings 26, 28. A plurality of spaced apart blades 30 are mounted on the lower portion of the shaft 20. The blades 30 function to agitate the contents of the tank 24.

A cylindrical hopper 32 is positioned on the top of the tank 24. The upper end of the tank 24 is open. A rim element 34 is provided on the upper end of the tank 24 for seating of the hopper 32. The element 34 is provided with an exterior annular groove 36 for a press-fit seat on the upper marginal edge 38 of the tank 24. A radially inwardly extending annular flange 40 defines, with upwardly projecting portion 42, a curved seating surface 44. A ring of resilient material 46 is provided between the hopper 32 and surface 44 to act as a sound deadening device.

A shaft 48 is coupled to the upper end of shaft 20 by means of a pin 50. A plurality of rods 52 project outwardly from the shaft 48 into the interior of the hopper 32. The rods 52 are spaced both vertically and peripherally. The function of the rods 52 is to maintain the powder contained within the hopper 32 in a loose condition so that it will flow freely into the tank 24. A rod 54 having a downwardly extending paddle 56 is provided at the lower end of the shaft 48. The paddle 56 functions as a sifter device to cause powder to flow through apertures provided between the hopper 32 and tank 24. A removable lid 58 is provided on top of the hopper for filling of the hopper.

Figure 2:
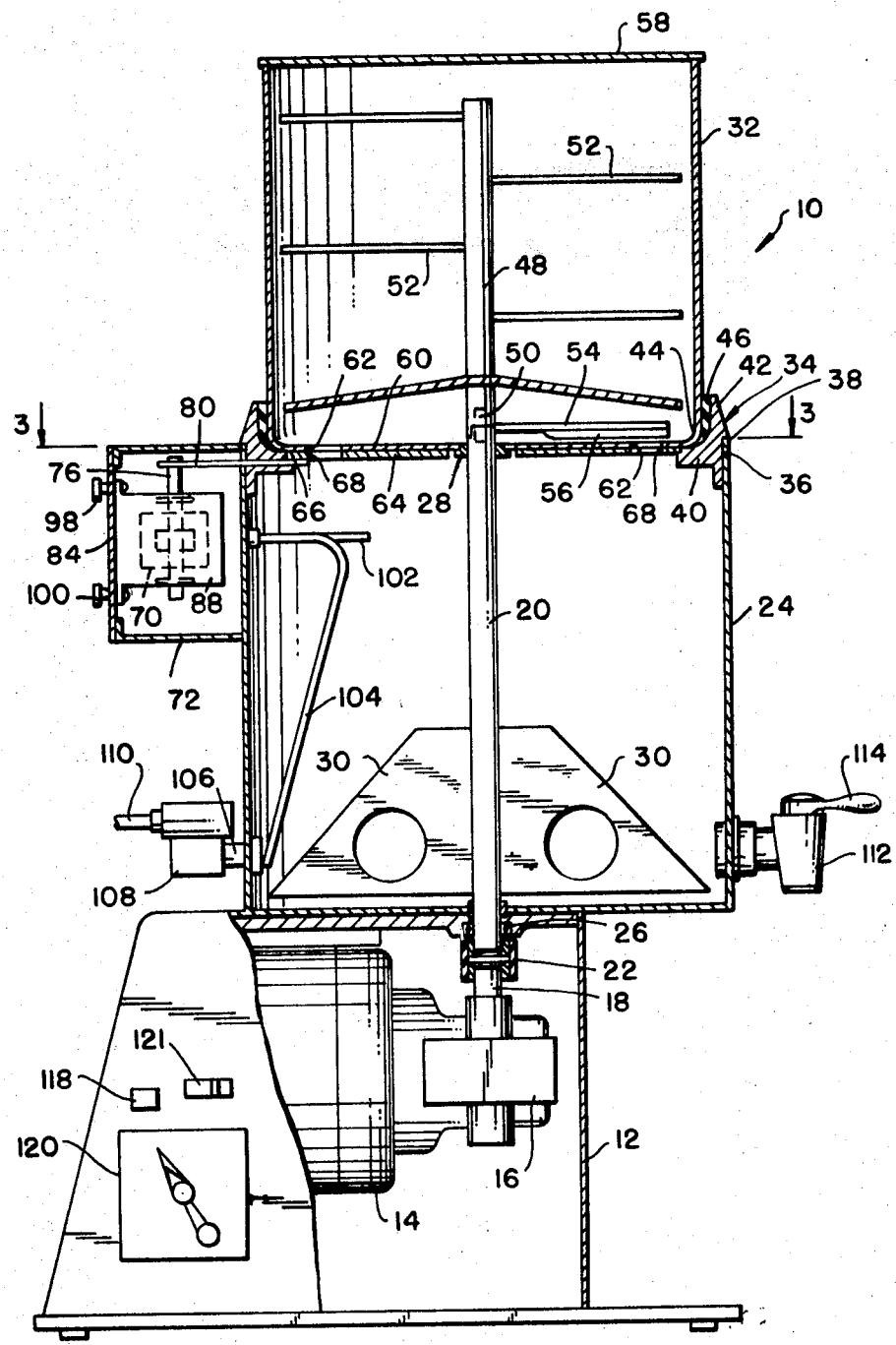
FIG. 2 is a side elevational view in section of the automatic mixer.
Figure 3:
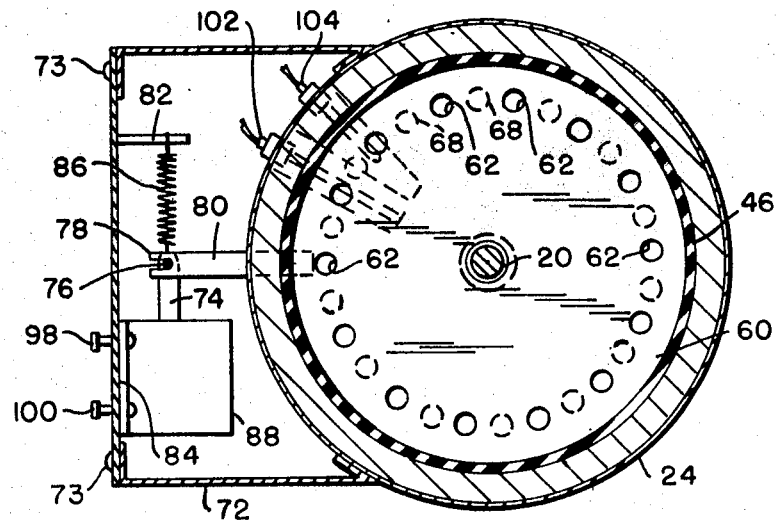
FIG. 3 is a sectional view taken substantially along the line 3—3 of FIG. 2 looking in the direction of the arrows.

As will be noted in FIGS. 2 and 3, the bottom wall 60 of the hopper, which defines a partition between the hopper and tank, is provided with a plurality of apertures 62 arranged in a circle around the center of the wall 60. A rotatable plate 64 is provided beneath the bottom wall 60. The plate 64 is received in a peripheral notch 66 provided in the rim element 34. The plate 64 has a plurality of apertures 68 arranged in a circle around the center of the plate. The apertures 68 define a circle having the same radius as the circle defined by the apertures 62 so that the apertures 62, 68 may be positioned in registry with one another to permit powder to flow therethrough into the tank 24.

The plate 64 is automatically rotated to cause the apertures 62, 68 to register during the operating cycle of the mixer 10. The solenoid 70 is positioned within a housing 72. The solenoid 70 has an extendible and retractable operating rod 74 which carries, at the outer end, an upstanding pipe 76. The pin 76 extends through the forked end 78 of a link 80. The link 80 is connected to the plate 64 as by welding. A rod 82 extends through the removable wall or plate 84 of housing 72 in spaced apart relationship to the link 80. A spring 86 extends between the rod 82 and link 80. The spring 86 urges the link 80 to a position where the apertures 62, 68 are out of alignment. Energization of the solenoid 70 causes retraction of the operating rod 74 to turn the plate 64 in the counterclockwise direction as viewed in FIG. 3. This causes alignment of the apertures 62, 68. When solenoid 70 is deenergized, spring 86 returns the rod 74 (and thereby link 80 and plate 64) to the original position where the apertures 62 and 68 are out of alignment.

The solenoid 70 is mounted on the removable plate or wall 84 by means of an adjustable clamp 88. The plate 84 is connected to housing 72 by a plurality of threaded fasteners 73, which are removable. As will be noted in FIG. 5, a pair of elongated parallel slots 90, 92 are provided in the plate 84. Externally threaded studs 94, 96 extend from the clamp 88 through the slots 90, 92. Internally threaded knobs 98, 100 threadingly engage the studs 94, 96. Loosening of the knobs 98, 100 permits movement of the studs 94, 96 in the slots 90, 92 thus permitting linear adjustment of the clamp 88 and solenoid 70. Adjustment of the solenoid 70 results in effectively shortening or lengthening the stroke of the operating rod 74 relative to the link 80. The degree of registry of the apertures 62, 68 may thus be adjusted to thereby effectively enlarge or reduce the resultant aperture size and thereby control the rate of flow of powder from the hopper 32 into the tank 24.

A pair of electrical sensing probes 102, 104 are provided within the tank 24. One of the probes 102 may be termed a high level probe as it terminates in the upper portion of the tank 24 and senses the high level of liquid within the tank. The other probe 104 may be termed a low level probe as it terminates adjacent the bottom of the tank 24 and senses a low level of liquid within the tank.

A liquid inlet 106 is provided adjacent the lower portion of the tank 24. A solenoid operated valve 108 is provided for the inlet 106. A hose 110 extends from the valve 108 to a source of liquid, such as water. An outlet spigot 112 is provided adjacent the lower end of the tank 24. The spigot 112 includes a valve which is manually operated by means of a handle 114. It will be noted that the spigot is capable of draining the tank 24 to a level beneath the lower end of the low level probe 104. A shield 116 is provided around the probes 102, 104 to shield the probes from powder sifting from the hopper 32 into the tank 24. Shield 116 also serves as a baffle to assist the agitation. This is accomplished by the fact that the long arm 117 on shield 116 extends downwardly into the tank 24 containing the liquid.

Operation of the automatic mixer 10 may now be understood. The mixer 10 is actuated by means of a double pole, single throw switch 118 located exteriorly of the base 12. Prior to actuation of the switch 118, an manually adjustable timer 120 is set to a preselected time interval to determine the length of time powder will be sifted from the hopper 32 into the tank 24. Powder flows at a known rate from the hopper 32, determined by the size of the aperture openings between the hopper and tank, and therefore the volume of powder which flows into the tank may be regulated by allowing the powder to flow for a predetermined time interval. When the switch 118 is turned on, indicator light 121 is energized. The motor 14 is also energized causing the shafts 20, 48 to rotate thus rotating the agitator blades 30, mixing rods 52 and sifting paddle 56. If the tank 24 is empty of liquid when the switch 118 is turned on, this will be sensed by the lower level probe 104. The low level probe will generate a signal which will cause, through circuitry to be later described, energization of the solenoid 126 of the inlet valve 108 thus causing liquid to flow into and fill the tank 24. When the tank 24 has been filled to a level determined by the high level probe 102, another signal will be generated causing deenergization of the solenoid 126 of the inlet valve 108 resulting in closing of the valve. At the same time, the signal from the probe 102 is effective to energize the solenoid 70 causing turning of the plate 64 to result in the apertures 62, 68 being in registry. Powder will then flow through the apertures aided by the sifter paddle 56. The timer 120 will also at this time be energized. At the end of the predetermined time, the timer will cause the solenoid 70 to be de-energized. The spring 86 will return the plate 64 to its original position to terminate the flow of powder from the hopper 32 into the tank 24.

The motor 14 will continue to run until the switch 118 is turned off. Depending upon the type of material being mixed, it may be desirable to continue agitation of the contents of the tank 24 to result in a good dispersion of the solid powder into the liquid contained in the tank 24. For example, one desirable use of the automatic mixer is to provide barium sulphate water solution of a predetermined density for use in connection with medical X-ray techniques. In one model of the automatic mixer, the tank 24 has a capacity of 1.5 gallons of solution. The cycle of filling the tank 24 with water and sifting the desired amount of barium sulphate powder into the tank is about three to four minutes.

Figure 4:
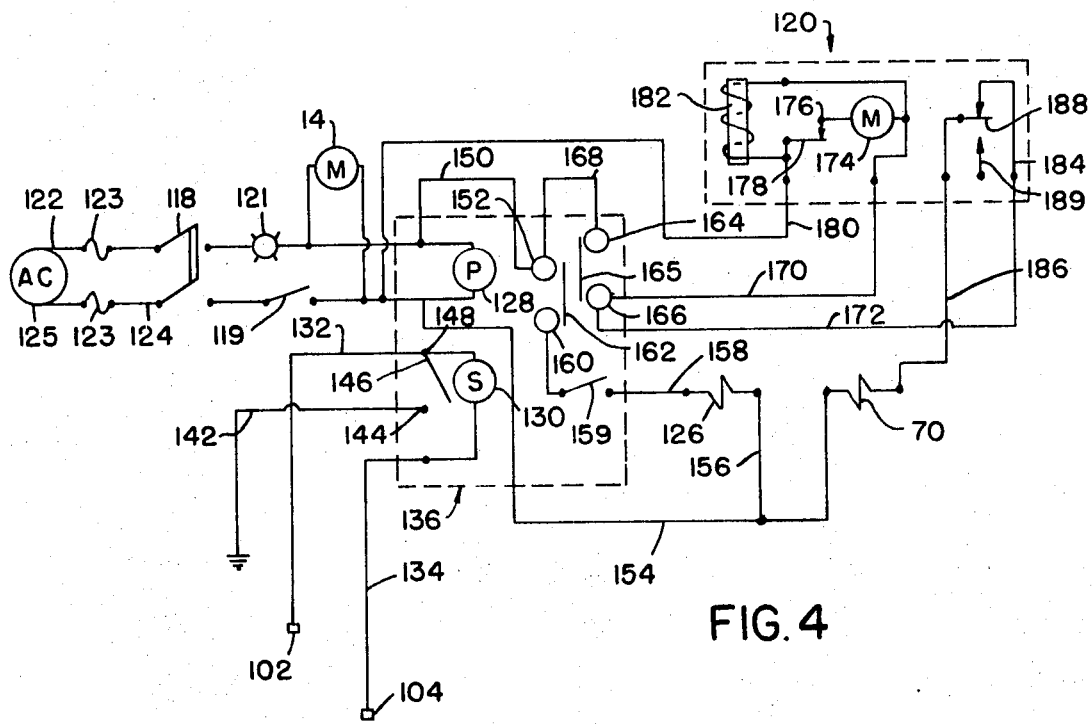
FIG. 4 is a schematic view of the electrical control system for the automatic mixer.

The electrical circuitry controlling the operation of the automatic mixer is illustrated in FIG. 4. A pair of leads 122, 124 extends from a source of AC power 125 and is provided with the switch 118. Interposed in leads 122 and 124 on one side of switch 118 are fuses 123. On the toher side of switch 118 is located an indicator light 121 in lead 122 and a single pole, single throw switch 119 is located in lead 124. Switch 119 is closed so long as the hopper 32 remains in position on the top of tank 24. When hopper 32 is removed from tank 24, switch 119 opens to break the circuit and thereby prevent current flow. The motor 14 is connected across the leads 122, 124. The motor 14 is energized upon closure of the switch 118 and remains energized as long as the switch 118 is closed.

A control relay 136 is provided between the probes, indicated at 102, 104, and the solenoid coil 126 which actuates the valve 108 and the solenoid coil 70 which causes rotation of the plate 64. The relay 136 includes a primary coil 128 which is placed across the leads 122, 124 and is thereby energized upon closure of switch 118. A secondary coil 130 is coupled to primary coil 128. These coils form a step-up transformer. The reason for this is to obtain a higher output voltage. A lead 132 extends from one side of the secondary coil 130 to the probe 102. Another lead 134 extends from the other side of the coil 130 to the probe 104. A third lead 142 extends from a center contact 144 to ground on the mixing tank 24. An arm 146 may interconnect contacts 148 of lead 132 and the contact 144. The contacts are normally open as illustrated.

A lead 150 extends between lead 122 and a contact 152. Another lead 154 extends from lead 124 to one side of the solenoid 70. A lead 156 extends from lead 154 to one side of the solenoid 126. Lead 158 extends from the other side of the solenoid 126 to a contact 160. Interposed in lead 158 is a single pole, single throw switch 159 which is normally closed. Switch 159 is manually opened when the operator desires to use a previous mix without starting the machine cycle as will susequently appear. Contacts 152, 160 are normally open. Closure of these contacts by means of switch arm 162 is caused by energization of the secondary coil 130.

A second set of contacts comprising contacts 164 and 166 are provided. The contacts 164 is connected to the contact 152 by lead 168. A pair of leads 170, 172 extends from the other contact 166. The lead 170 is connected to one side of the timer motor 174. The other side of the motor 174 is connected to a contact 176. The contact 176 is normally closed by switch arm 178. The switch arm 178 is connected to power lead 124 by lead 180. The timer coil 182 is placed in parallel with the motor 174. The other lead 172 is connected to a contact 184. The contact 184 is connected to one side of the solenoid 70 by a lead 186 and switch arm 188.

The sequential operation of the mixer 10 may now be understood. Assuming that the tank 24 is empty, the switch 118 is closed and light 121 is energized. This results in energizing the motor 14 and thus providing agitation for the contents of the tank 24 and hopper 32. The primary coil 128 is also energized. This results in building up an electrical field in the secondary coil 130 and also in the closure of the contacts 144, 148, thus grounding one side of the coil 130 and permitting current to flow therethrough. The opposite side of the coil 130 will be at a potential other than ground and therefore current may flow therethrough. Energization of the coil 130 will result in the contacts 152, 160 being closed by switch arm 162. Both sides of the solenoid 126 will thus be connected to power and the solenoid will be energized causing opening of the valve 108 and filling of the tank with liquid.

When the liquid level reaches the probe 102, a current path is provided between the probes 102, 104. This results in both sides of the coil 130 being at the same potential, namely ground potential. As a consequence, current will no longer flow through the coil 130 and the coil is effectively de-energized. This results in opening of the contacts 152, 160 and closing of the contacts 164, 166. The solenoid 126 is thereby de-energized resulting in closing of the valve 108 and discontinuance of filling of the tank 24 with liquid. However, the solenoid 70 will now be energized, it being connected to one side of power by lead 154 and to the other side of power by lead 186, switch arm 188, contact 184, lead 172, contact 166, switch arm 165, contact 164, lead 168, contact 152, lead 150 to lead 122. Energization of solenoid 70 will cause rotation of the plate 64 thus placing the apertures 62, 68 in registry. Powdered material will now flow from the hopper 32 into the tank 24 at a rate determined by the size of the aperture openings.

At the same time that the solenoid 70 is energized, the timer motor 174 is also energized. One side of the motor 174 is connected to power by a contact 176, switch arm 178, lead 180 to lead 124. The other side of the motor 174 is connected to lead 122 via lead 170, contact 166, switch arm 165, contact 164, lead 168, contact 152, and lead 159. Energization of the timer motor will start the running of the time interval during which powder will flow from the hopper 32 into the tank 24. When the desired time interval has passed, the switch arm 188 will move from the position illustrated over to a contact 189. This opens the connection between lead 172 and lead 186 thus de-energizing the solenoid 70 and causing the plate 64 to rotate back to its initial position to discontinue flow of powdered material from the hopper 32 into the tank 24.

Agitation of the contents of the tank 24 will continue as long as the switch 118 is closed. Depending upon the mixture or solution being prepared, the additional agitation may be continued for as long as necessary. When it is desired to stop agitation, the switch 118 is merely opened. The mixture then may be drained from the tank 24 through the spigot 112 for use.

For automatic operation the switch 118 remains closed. Should the level of the mixture at any time fall below the probe 104, the cycle will be repeated and the tank 24 will be replenished with a new supply of the desired mixture.

In certain instances the power supply to the machine 10 will be terminated prior to the entire mixture tank 24 being dispensed. This could occur at the end of a normal working day, with tank 24 containing a useable quantity of the mixture. The remaining mixture in the tank 24 may be used the following day without beginning the filling and mixing cycle. In such a situation it is first necessary to open switch 159 prior to closing the main switch 118. The opening of switch 159 breaks the circuit to solenoid 126 which controls the water inlet valve 108. Once the useable barium sulphate solution or other mixture has been used, switch 159 is closed and the machine 10 is set for automatic operation.

When it is desired to clean the tank 24, the timer 120 is set at zero so that the solenoid 70 will not be energized even if the level within the tank 24 reaches the probe 102. In the cleaning process, the switch 118 is closed whereupon the tank 24 will fill with clear liquid, normally water. This material will be agitated as the result of energization of the motor 14. This action will cause cleaning of the tank interior. The tank may be constantly drained by means of the spigot 112 during the cleaning process, or the spigot 112 may be opened after the tank has been filed and agitated. The process may be repeated as necessary.

The machine 10 is electronically controlled and will mix as an example, a barium sulphate solution to a predetermined density and replenish its supply of solution when the mixing tank 24 is empty. These operations are all performed by the machine itself, completely eliminating the need of a technician to manually measure out portions of barium sulphate into given volumes of water. As indicated previously the machine 10 employs time and volume controls for its operation. The timer control 120 is the only variable control on machine 10 and governs the amount of powder that is brought into mixture with the liquid in tank 24.

At start up with tank 24 empty, an aide or technician is only required to verify that the hopper 32 is full. Thereafter the switch 118 is turned to the on position. Thereafter, the solenoid operated water inlet valve 108 supplies water on demand to the tank 24. The lower sensing probe 104 senses that the mixing tank 24 empty and transmits two signals. One signal goes to the water inlet valve 108 calling for water while the other signal goes to the timer control 120 which then sets itself to the preselected time setting. When the water level in tank 24 reaches the upper sensing probe 102, three signals are transmitted. One signal goes to the water inlet valve 108 and closes same. The second signal goes to the solenoid 70 which operates the apertured plate 64 thus allowing the barium sulphate powder to drop into the mixing tank 24. The third signal releases the timer control 120 which will now time out the charge of barium sulphate. All three signals are simultaneous. When the timer control 120 has timed out it will send a signal to solenoid 70 to deenergize same as explained previously. The solution is mixed and is then ready for use. The cycle herein described will automatically repeat itself upon demand of the lower sensing probe 104.

What we claim as our invention is:

1. An automatic mixer comprising a mixing tank, power driven agitator means in said tank, an inlet for liquid into said tank, a valve in said inlet, first electrical means to open and close said valve, an outlet from said tank, liquid sensing means in said tank operative to generate a first signal and cause said first electrical means to open said valve when the level reaches a predetermined low and operative to generate a second signal and cause said first electrical means to close said valve when the level reaches a predetermined high, a reservoir for powdered material above said tank, a partition between the tank and reservoir, said partition having aperture means for gravity flow of powdered material, closure means for said aperture means, second electrical means to open said closure means, an electrically operated timer structure operative upon energization to close the closure means after a predetermined interval, said second signal from the liquid level sensing means being operative to cause said second electrical means to open said closure means and to energize the timer structure.

2. An automatic mixer as defined in claim 1, and further characterized in that said closure means for said aperture means comprises a plate relatively movable with respect to said partition, said plate having aperture means therein for registry with the aperture means in said partition, said second electrical means being operative to relatively move the partition and plate to one position where the apertures are out of registry and to another position where the apertures are in registry.

3. An automatic mixer as defined in claim 2, and further characterized in the provision of means for adjusting the degree of relative movement of the partition and plate to thereby vary the size of the effective aperture means therethrough.

4. An automatic mixer as defined in claim 3, and further characterized in that said second electrical means comprises an electrical solenoid having an operating arm connected to said plate for movement thereof, bracket means adjustably secured to said mixer, said bracket means being adjustable to different positions to thereby alter the angle of said operating arm with respect to said plate to thereby vary the effective stroke of the operating arm with respect to the plate.

5. An automatic mixer as defined in claim 4, and further characetrized in the provision of spring means connected between said plate and mixer biasing the plate to a position where the apertures of the plate are out of registry with the apertures of the partition.

6. An automatic mixer as defined in claim 5, and further characterized in that said timer structure includes a set of contacts in series with said solenoid, said contacts being opened after said predetermined interval to de-energize the solenoid and permit the spring means to return the plate to its initial position.

7. An automatic mixer as defined in claim 1, and further characterized in that said liquid level sensing means includes a high level probe and a low level probe within said tank, said low level probe generating said first signal when the level of liquid within the tank is below the low level probe, said high level probe completing a circuit between the probes through the liquid when the liquid level reaches the high level probe to generate said second signal.

8. An automatic mixer as defined in claim 1, and further characterized in the provision of an electric motor to drive the agitator means in said tank, switch means to close a circuit to a source of electrical power to energize the electric motor and the remaining electrical circuitry, said motor remaining energized through the entire sequence of operation until said switch is opened.

9. An automatic mixer as defined in claim 1, and further characterized in the provision of agitator means in said hopper to maintain the contents thereof in a loose condition, said hopper agitator means being operatively connected to the agitator means in the tank to be driven therewith.

10. An automatic mixer as defined in claim 1, and further characterized in that said hopper has a generally cylindrical shape whereby powdered material will easily fall downwardly therein without clinging to the interior surface of the hopper.

11. An automatic mixer as defined in claim 1, and further characterized in the provision of a sifting paddle in said hopper adjacent to said partition to drive powdered material through said aperture means, said sifter paddle being operatively connected to the agitator means in the tank to be driven therewith.

12. An automatic mixer as defined in claim 1, and further characterized in that said timer structure has an operative position wherein it will maintain said second electrical means inoperative during a cycle of operation to prevent the flow of powdered material into said tank whereby the tank may be cleaned by filling it with liquid through said valve by initiating the operating sequence of the mixer.

13. An automatic mixer comprising a mixing tank, agitator means in said tank, an inlet for liquid into said tank, an outlet from said tank, a reservoir for powdered material above said tank, a partition between the tank and reservoir, said partition having aperture means for gravity flow of powdered material, closure means for said aperture means, electric circuitry operative upon energization to cause liquid to flow into said tank and fill the tank to a predetermined level and to cause opening of said aperture means for a predetermined time for flow of a predetermined amount of powdered material from said reservoir into said tank.

References Cited
UNITED STATES PATENTS

| | | | |
|---|---|---|---|
| 3,110,421 | 11/1963 | Matthias | 259—154 |
| 3,326,530 | 6/1967 | Schlernitzauer | 259—8 |
| 3,378,235 | 4/1968 | Udy | 259—24 |

ROBERT W. JENKINS, Primary Examiner

U.S. Cl. X.R.

259—8

UNITED STATES PATENT OFFICE
CERTIFICATE OF CORRECTION

Patent No. 3,606,271  Dated September 20, 1971

Inventor(s) Robert T. Schmidt, Frederick J. Sicheneder and Paul W. Rowe

It is certified that error appears in the above-identified patent and that said Letters Patent are hereby corrected as shown below:

Column 2, line 70, "pipe" should be --pin-- (application, page 6, line 14).

Column 3, line 56, "an" should be --a-- (application, page 8, line 10).

Column 4, line 31, "toher" should be --other-- (application, page 9, line 28).

Column 4, line 64, "susequently" should be --subsequently-- (application, page 11, line 3).

Column 4, line 69, "contacts" should be --contact-- (application, page 11, line 8).

Column 5, line 47, "159" should be --150-- (application, page 13, line 3).

Column 6, line 16, "filed" should be --filled-- (application, page 14, line 18).

Column 6, line 35, before "empty" "is" should be inserted. (application, page 15, line 9).

Column 6, line 58, after "liquid", insert --level-- (Claim 1, line 5 of application).

Column 8, line 30, "aperature" should be --aperture-- (application, Claim 13, line 5).

Signed and sealed this 27th day of June 1972.

(SEAL)
Attest:

EDWARD M. FLETCHER, JR.
Attesting Officer

ROBERT GOTTSCHALK
Commissioner of Patents